United States Patent
Scafidi et al.

(10) Patent No.: US 11,473,909 B2
(45) Date of Patent: Oct. 18, 2022

(54) USE OF MEMS GYROSCOPE FOR COMPENSATION OF ACCELEROMETER STRESS INDUCED ERRORS

(71) Applicant: INVENSENSE, INC., San Jose, CA (US)

(72) Inventors: Pietro Scafidi, Milan (IT); Kevin Hughes, San Jose, CA (US); Daniele Ghezzi, Milan (IT)

(73) Assignee: INVENSENSE, INC., San Jose, CA (US)

( * ) Notice: Subject to any disclaimer, the term of this patent is extended or adjusted under 35 U.S.C. 154(b) by 0 days.

(21) Appl. No.: 16/996,523

(22) Filed: Aug. 18, 2020

(65) Prior Publication Data

US 2021/0278212 A1 Sep. 9, 2021

Related U.S. Application Data

(60) Provisional application No. 62/984,893, filed on Mar. 4, 2020.

(51) Int. Cl.

| | |
|---|---|
| *G01C 19/5712* | (2012.01) |
| *G01P 15/08* | (2006.01) |
| *G01P 15/18* | (2013.01) |
| *G01P 1/00* | (2006.01) |
| *G01K 13/00* | (2021.01) |
| *G01P 21/00* | (2006.01) |
| *G01C 19/5776* | (2012.01) |

(52) U.S. Cl.
CPC ..... *G01C 19/5712* (2013.01); *G01C 19/5776* (2013.01); *G01K 13/00* (2013.01); *G01P 1/00* (2013.01); *G01P 15/08* (2013.01); *G01P 15/18* (2013.01); *G01P 21/00* (2013.01)

(58) Field of Classification Search
CPC . G01P 15/08; G01P 15/18; G01P 1/00; G01C 19/5712
See application file for complete search history.

(56) References Cited

U.S. PATENT DOCUMENTS

| | | | | |
|---|---|---|---|---|
| 5,890,093 A | * | 3/1999 | Mark | G01C 21/16 702/94 |
| 6,474,160 B1 | * | 11/2002 | Stewart | G01C 19/56 73/504.04 |
| 8,156,806 B1 | * | 4/2012 | Cardarelli | G01C 21/16 73/511 |
| 8,816,492 B1 | | 8/2014 | Minervini | |

(Continued)

FOREIGN PATENT DOCUMENTS

EP 3021124 5/2016

OTHER PUBLICATIONS

International Search Report and Written Opinion for International Application No. PCT/US2021/018830, dated Jun. 9, 2021.

*Primary Examiner* — Helen C Kwok
(74) *Attorney, Agent, or Firm* — Haley Guiliano LLP (57) ABSTRACT

A MEMS system includes a gyroscope that generates a quadrature signal and an angular velocity signal. The MEMS system further includes an accelerometer that generates a linear acceleration signal. The quadrature signal and the linear acceleration signal are received by a processing circuitry that modifies the linear acceleration signal based on the quadrature signal to determine linear acceleration.

20 Claims, 7 Drawing Sheets

(56) References Cited

U.S. PATENT DOCUMENTS

| | | | |
|---|---|---|---|
| 9,207,254 B2 | 12/2015 | Simoni | |
| 9,212,908 B2 | 12/2015 | Geen | |
| 9,218,065 B2 | 12/2015 | Mahameed | |
| 9,284,182 B1 | 3/2016 | Shah | |
| 2007/0240486 A1* | 10/2007 | Moore | G01C 21/16 |
| | | | 73/1.37 |
| 2009/0223276 A1 | 9/2009 | Rudolf et al. | |
| 2010/0307241 A1* | 12/2010 | Raman | G01C 19/56 |
| | | | 73/504.12 |
| 2011/0056294 A1 | 3/2011 | Simoni | |
| 2013/0239650 A1 | 9/2013 | Chau et al. | |
| 2013/0283908 A1 | 10/2013 | Geen | |
| 2014/0352400 A1* | 12/2014 | Barrilado | G01P 15/0802 |
| | | | 73/1.38 |
| 2014/0373595 A1* | 12/2014 | Glueck | G01C 25/005 |
| | | | 73/1.38 |
| 2015/0276407 A1* | 10/2015 | Bhandari | G01C 19/5776 |
| | | | 73/504.12 |
| 2016/0139170 A1* | 5/2016 | Dwyer | G01P 15/03 |
| | | | 73/514.29 |

* cited by examiner

302 — Example of Multilinear Fitting

304

| Stress Condition | AO_real | GXQ | GYQ | GZQ | AO_est |
|---|---|---|---|---|---|
| Cond#1 | 4.5 | 0.5 | 40.7 | 2.2 | 4.9 |
| Cond#2 | 2.5 | -4.6 | 44.7 | 3.0 | 1.7 |
| Cond#3 | 3.5 | -2.0 | 42.7 | 2.6 | 3.3 |
| Cond#4 | 7.4 | 12.1 | 37.3 | 1.4 | 7.9 |
| Cond#5 | 11.1 | 9.4 | 33.2 | 0.8 | 10.7 |
| Cond#6 | 9.2 | 10.7 | 35.3 | 1.1 | 9.3 |
| Cond#7 | -10.1 | 3.0 | -3.3 | -0.5 | -11.0 |
| Cond#8 | -10.6 | 2.7 | -2.9 | -0.5 | -10.1 |
| Cond#9 | -10.3 | 2.8 | -3.1 | -0.5 | -10.6 |
| Cond#10 | -6.3 | -6.3 | 14.3 | 0.9 | -6.1 |
| Cond#11 | -9.2 | -3.2 | 13.1 | 0.9 | -8.6 |
| Cond#12 | -7.7 | -4.8 | 13.7 | 0.9 | -7.4 |

$AO\_est = -0.15 * GXQ + 0.97 * GYQ - 10.16 * GZQ - 12.6$

USE OF MEMS GYROSCOPE FOR COMPENSATION OF ACCELEROMETER STRESS INDUCED ERRORS

CROSS-REFERENCE TO RELATED APPLICATIONS

This application claims priority to U.S. Provisional Application No. 62/984,893, filed on Mar. 4, 2020, titled "USE OF MEMS GYROSCOPE FOR COMPENSATION OF ACCELEROMETER STRESS INDUCED ERRORS", by Scafidi, et al., the disclosure of which is incorporated by reference as though set forth in full.

BACKGROUND

Numerous items such as smartphones, smart watches, tablets, automobiles, aerial drones, appliances, aircraft, exercise aids, and game controllers utilize sensors during their operation (e.g., motion sensors, pressure sensors, temperature sensors, etc.). In commercial applications, microelectromechanical (MEMS) sensors such as accelerometers and gyroscopes capture complex movements and determine orientation or direction. For example, smartphones are equipped with accelerometers and gyroscopes to understand the movement of the smartphone, to augment navigation systems that rely on Global Position System (GPS) information, and to perform numerous other functions. Wearable devices and internet-of-things (IoT) devices constantly measure movement and other characteristics of a person, animal, or electronic device. In another example, drones and aircraft determines orientation based on gyroscope measurements (e.g., roll, pitch, and yaw) and vehicles of all types implement assisted driving to improve safety (e.g., to recognize skid or roll-over conditions).

Accelerometers of a MEMS system, when housed in a MEMS chip, may be subject to certain manufacturing or in-field external stresses. During manufacturing, even typical tolerances may result in the MEMS chip experiencing certain imparted forces as stress. Component installation during production processes, such as soldering, can induce forces absorbed by the MEMS chip as stress. Other manufacturing processes with stress-inducing conditions may occur during packaging such as the MEMS system susceptibility to board-bending. In-field stress sources may also vary. For example, the MEMS device may experience displacement of moving mechanical parts from normal wear and bending conditions from transport. An external stress impact on a MEMS system can propagate to a corresponding impact on the internal sensors of the system. For example, a stress with a bending effect on the MEMS chip corresponds to a related stress experienced by the accelerometer of the MEMS chip. Externally induced stresses can introduce errors into the accelerometer measurements. Changes in environmental conditions such as temperature may result in stresses imparted on the MEMS chip.

These stresses may result in measurement errors of a MEMS sensor such as a MEMS accelerometer. Some methods for error measurement and/or compensation rely on additional hardware, in some cases, to carry out certain test routines that may be located internally or externally to the MEMS chip to compensate for stress-related measurement errors (e.g., a linear acceleration output by the accelerometer of the MEMS chip). The extra hardware required by these approaches tends to cause the MEMS chip footprint and the system power consumption to increase.

SUMMARY

In some embodiments of the present disclosure, a microelectromechanical (MEMS) system includes a gyroscope that outputs a quadrature signal and an angular velocity signal, and an accelerometer that outputs a linear acceleration signal. The MEMS system may further include a processing circuitry coupled to the gyroscope and the accelerometer to receive the quadrature signal and the linear acceleration signal. The processing circuitry modifies the linear acceleration signal based on the quadrature signal.

In some embodiments of the present disclosure, a MEMS system includes a gyroscope that outputs a quadrature signal and an angular velocity signal and an accelerometer that outputs a linear acceleration signal. The MEMS system may further include a processing circuitry coupled to the gyroscope and the accelerometer to receive the quadrature signal and the linear acceleration signal. The processing circuitry may determine a level of stress on the accelerometer based on the quadrature signal and transmits an error signal based on the level of stress.

In some embodiments of the present disclosure, a method of determining a linear acceleration on a microelectromechanical system (MEMS) system includes receiving a quadrature signal and an angular velocity signal generated by a gyroscope and further receiving a linear acceleration signal generated by an accelerometer. The method may further include modifying the linear acceleration signal based on the quadrature signal and determining the linear acceleration based on the modified linear acceleration signal.

BRIEF DESCRIPTION OF THE DRAWINGS

The above and other features of the present disclosure, its nature, and various advantages will be more apparent upon consideration of the following detailed description, taken in conjunction with the accompanying drawings in which.

DETAILED DESCRIPTION OF THE DRAWINGS

MEMS sensor devices, formed on a MEMS chip of a MEMS system, undergo stress contributing, at least in part, to onboard accelerometer sensor output shifts. Whether the stress is manufacturing induced (e.g., post-soldering, board bending) or in-field induced (e.g., mechanical wear), accelerometer sensor output shifts ultimately translate to linear acceleration measurement errors, an undesirable outcome. The system may be exposed to yet a secondary source of stress—temperature variation effects—further contributing to errors in measuring linear acceleration during a MEMS device regular operation.

MEMS sensor devices may measure linear acceleration, an accelerometer-sensed inertial measurement, in addition to angular velocity, a gyroscope-sensed inertial measurement. Both sensors can and often are commonly formed on a single MEMS die, housed in the MEMS chip. Up to three accelerometer sensors may measure up to three axes of a device movement (linear acceleration) and up to three gyroscope sensors may measure up to three axes of a device rotation (angular velocity). Whether in production or in-field, when the sensors' common housing—the packaged MEMS chip—experiences an external stress impact, the MEMS inertial sensors may experience a change in response due to the imparted compression, tension, shear, bending, or tension.

Gyroscopes typically measure device rotational motion (e.g., based on motion of proof masses relative to sense electrodes due to a Coriolis force) and absent angular velocity about the measured axis, the gyroscope sense electrodes should not sense a motion due to angular velocity. Whether angular velocity is present or not, the gyroscope may sense a quadrature signal based on a movement of the proof mass in response to the drive motion of the gyroscope. This quadrature signal is responsive to the externally applied thermo-mechanical stresses experienced by the MEMS device, such as stress caused by post-soldering manufacturing processes, board bending, and a temperature response. The externally induced stresses cause the gyroscope quadrature response to change, which may be sensed at the gyroscope output by measuring the gyroscope quadrature signal.

The gyroscope quadrature signal may be utilized as a measure of stress experienced by a gyroscope and a commonly housed accelerometer. The relationship between the gyroscope-generated quadrature signal measurement and the externally applied stress level may be determined, additionally, the further relationship between the commonly housed accelerometer response and the applied stress level can be determined. The effect of the stress level on the acceleration output measurement corresponds to an error which may be compensated to determine a more accurate measure of acceleration. These relationships may be estimated during a corresponding MEMS system manufacturing process or beyond, when the MEMS system is at rest. The estimated acceleration output error measurement may then be used to compensate a measured acceleration value during regular MEMS device operation.

In accordance with an embodiment of the disclosure, a MEMS system includes a MEMs chip with onboard gyroscope and accelerometer sensors. The gyroscope is configured to output a quadrature signal and an angular velocity signal, and the accelerometer is configured to output a linear acceleration signal. The MEMS chip further includes a processing circuitry coupled to the gyroscope sensor and the accelerometer sensor that receives the quadrature signal and the linear acceleration signal and modifies the linear acceleration signal based on the quadrature signal. The modification of the linear accelerometer signal is based on one or more compensation values, each compensation value associating a corresponding value of the quadrature signal with an external stress applied to the MEMS chip. In some cases, the processing circuitry may determine the external stress level exceeds a tolerable threshold stress level, a detected condition the processing circuitry may report as an error. The processing circuitry may determine to forego performing linear acceleration error compensation based on the detected intolerable stress level, or not.

To determine the compensation values, a set of controlled external stresses is applied to the MEMS system over a known range of stress levels known to be typical to the MEMS system environment. In some embodiments, in addition to controlled stress level conditions, to determine the compensation values, the MEMS system may be made to undergo a set of controlled temperature variations as a secondary source of external stress to the MEMS system or to induce the stress conditions. The set of controlled temperatures may be similarly applied over a known range of temperatures to the MEMS chip. In some embodiments, to simplify stress testing, a reduced set of distinct temperature variations in the known range of temperatures may be adequate for an effective temperature-inducing stress level simulation. For example, the known range of temperatures may include a set of merely two distinct temperatures applied to the MEMS chip to estimate the linear acceleration error measurement.

Simulated stress conditions for both external mechanically induced stresses as well as temperature varying stresses are employed to generate a relationship between quadrature and/or temperature measurements and an estimated linear acceleration error. During regular operation, linear acceleration error compensation may be performed on the MEMS chip to negate the effects of the external stresses. The estimated linear acceleration error may be determined during manufacturing, in a controlled environment, or in-field. In some cases, the MEMS system further includes a temperature sensor configured to generate a temperature signal reflective of the internal temperature of the MEMS chip, a potential basis for additional modification to the linear acceleration signal.

In some embodiments, the axis of an angular velocity measured by the MEMS chip gyroscope is the same as an axis of linear acceleration measured by the MEMS chip accelerometer. Alternatively, or additionally, the axis of angular velocity measured by the gyroscope may be orthogonal to an axis of linear acceleration measured by the accelerometer. In some cases, for greater linear acceleration prediction accuracy and to facilitate a different kind of stress level measurement, a second gyroscope is configured to output a second quadrature signal and a second angular velocity signal. Accordingly, the processing circuitry may make additional modifications to the linear acceleration signal based on the second quadrature signal. Yet a third gyroscope may be configured to output a third quadrature signal and a third angular velocity signal for a three-axis quadrature signal measurement in which case, the processing circuitry is configured to further modify the linear acceleration signal, accounting for the third quadrature signal. Analogously, the MEMS system may include a second accelerometer configured to output a second linear acceleration signal, the processing circuitry may modify the second linear acceleration signal based on the one or more gyroscope quadrature signals from the one or more on-board gyroscopes.

Figure 1:
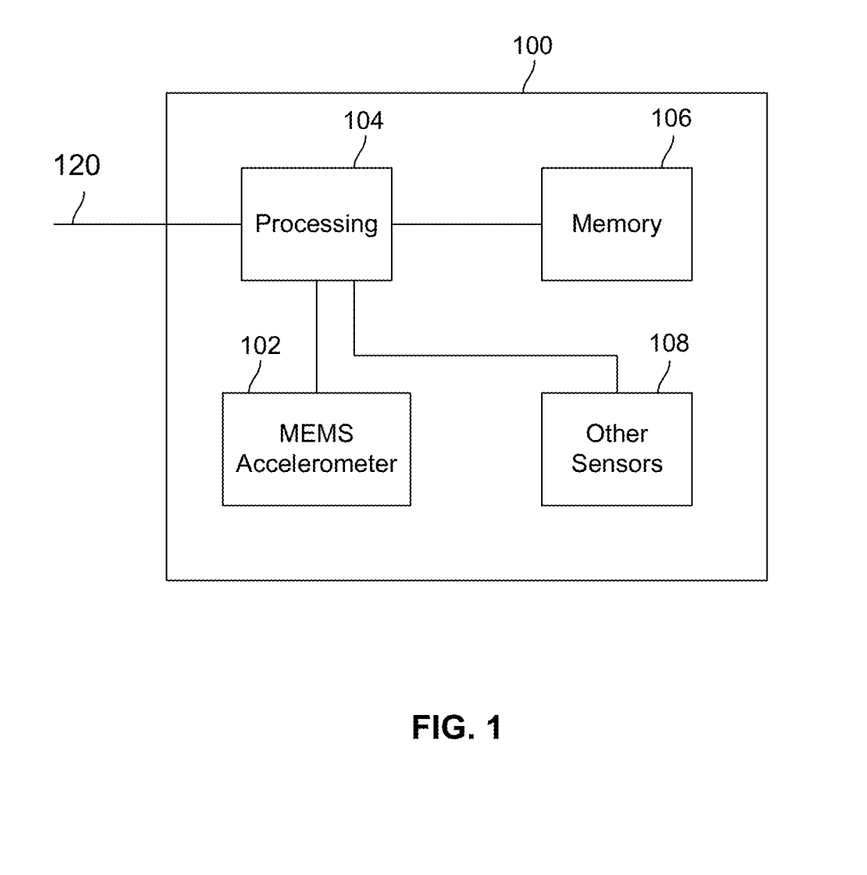
FIG. 1 depicts an exemplary motion sensing system in accordance with at least some embodiments of the present disclosure.

FIG. 1 depicts an exemplary motion sensing system 100 in accordance with some embodiments of the present disclosure. Although particular components are depicted in FIG. 1, it will be understood that other suitable combinations of sensors, processing components, memory, and other circuitry may be utilized as necessary for different applications and systems. In an embodiment as described herein, the motion sensing system may include at least a MEMS accelerometer 102 (e.g., a single- or multi-axis accelerometer for measuring linear acceleration along one or more axes) and supporting circuitry, such as processing circuitry 104 and memory 106. In some embodiments, one or more additional sensors 108 (e.g., MEMS gyroscopes, additional MEMS accelerometers, MEMS microphones, MEMS pressure sensors, temperature sensors, and a compass) may be included within the motion processing system 100 to provide an integrated motion processing unit ("MPU") (e.g., including 3 axes of MEMS gyroscope sensing, 3 axes of MEMS accelerometer sensing, microphone, pressure sensor, and compass).

Processing circuitry 104 may include one or more components providing necessary processing based on the requirements of the motion processing system 100. In some embodiments, processing circuitry 104 may include hardware control logic that may be integrated within a chip of a sensor (e.g., on a substrate or capacitor of a MEMS accelerometer 102 or other sensor 108, or on an adjacent portion of a chip to the MEMS accelerometer 102 or other sensor 108) to control the operation of the MEMS accelerometer 102 or other sensors 108 and perform aspects of processing for the MEMS accelerometer 102 or other sensors 108. In some embodiments, the MEMS accelerometer 102 and other sensors 108 may include one or more registers that allow aspects of the operation of hardware control logic to be modified (e.g., by modifying a value of a register). In some embodiments, processing circuitry 104 may also include a processor such as a microprocessor that executes software instructions, e.g., that are stored in memory 106. The microprocessor may control the operation of the MEMS accelerometer 102 by interacting with the hardware control logic, and process signals received from MEMS accelerometer 102. The microprocessor may interact with other sensors in a similar manner.

Although in some embodiments (not depicted in FIG. 1), the MEMS accelerometer 102 or other sensors 108 may communicate directly with external circuitry (e.g., via a serial bus or direct connection to sensor outputs and control inputs), in an embodiment the processing circuitry 104 may process data received from the MEMS accelerometer 102 and other sensors 108 and communicate with external components via a communication interface 110 (e.g., a SPI or I2C bus, in automotive applications a controller area network (CAN) or Local Interconnect Network (LIN) bus, or in other applications suitable wired or wireless communications interfaces as is known in the art). The processing circuitry 104 may convert signals received from the MEMS accelerometer 102 and other sensors 108 into appropriate measurement units (e.g., based on settings provided by other computing units communicating over the communication bus 110) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS accelerometer 102 or other MEMS sensors 108.

In some embodiments, certain types of information may be determined based on data from multiple MEMS inertial sensors 102 and other sensors 108, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

An exemplary MEMS accelerometer 102 may include one or more movable proof masses that are configured in a manner that permits the MEMS sensor to measure a desired force (e.g., linear acceleration) along an axis. In some embodiments, the MEMS accelerometer may be part of a MEMS die additionally housing at least one gyroscope, both exposed to controlled stress conditions. Based on the measured gyroscope quadrature signal compensation values, an estimated acceleration error is generated for each stress condition, compensated for by the processing circuitry. For further stress level compensation, the MEMS chip may be exposed to controlled temperature conditions.

Figure 2:
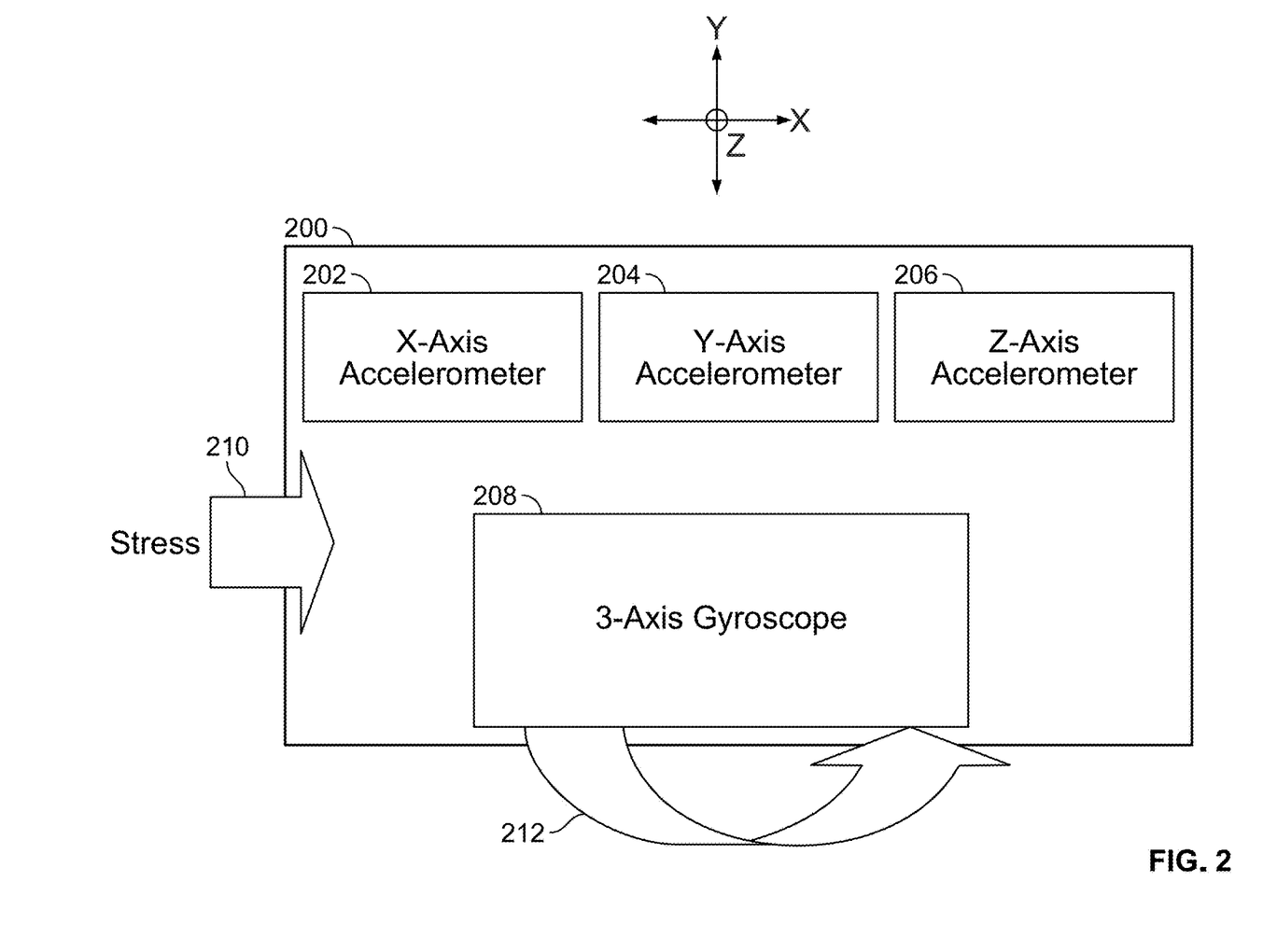
FIG. 2 depicts an exemplary MEMS chip in accordance with at least some embodiments of the present disclosure.

FIG. 2 shows an exemplary MEMS system with on-chip gyroscope and accelerometer sensors, in accordance with some embodiments of the present disclosure. The MEMS system of FIG. 2 and subsequent figures to follow depict nonlimiting examples of MEMS systems embodied on a common MEMS chip. The exemplary MEMS system of FIG. 2 includes a three-axis gyroscope and a three-axis accelerometer. It is understood that a MEMS system in accordance with various embodiments of the disclosure may include one or more gyroscopes indicative of a correspondingly different number of axes, one or more accelerometers indicative of a correspondingly different number of axes, or a combination thereof.

In FIG. 2, a MEMS chip 200 is shown to include an x-axis accelerometer 202, a y-axis accelerometer 204, a z-axis accelerometer 206, and a three-axis gyroscope 208, in accordance with an embodiment of the disclosure. Sensors may be a single sensor device capable of sensing multiple axes or they may be a single sensor capable of sensing a single axis. In the embodiment of FIG. 2, gyroscope 208 is a single sensor with the capability to sense three axes. In some embodiments, multiple distinct gyroscopes (e.g., three gyroscopes) may each sense a single axis at the same time. It is understood that gyroscope 208 may be a single sensor capable of sensing a single axis or capable of sensing two axes, alternatively, gyroscope 208 may be a single sensor capable of sensing two axes. Analogously, accelerometers 202-206, while shown as distinct components in FIG. 2, may be housed in a singular sensor package.

MEMS chip 200 is shown to undergo at least two distinct stresses 210 and 212, each of a distinct type and stress level. For example, stress 210 may be an applied lateral stress in the direction of the arrow representing stress 210 in FIG. 1, while stress 212 may be an applied torsional stress in the direction shown by the arrow representing stress 212, in FIG. 1. Either of these or other applied stresses may be the result of various forces applied to the MEMS chip such as component soldering during semiconductor manufacturing processes, assembly with other components, or stresses on integrated devices in the field. Formed on a common MEMS die, components of MEMS chip 200, for example, accelerometers 202-206 and gyroscope 208, experience particularized stresses based on their design and location relative to stresses 210 and 212.

By virtue of sharing a common semiconductor die onto which the accelerometers 202-206 and gyroscope 208 are formed, it may be possible to identify relationships between the stress effects experienced by the accelerometers 202-206 and gyroscope 208 of MEMS chip 200. Even if accelerometers 202-206 and gyroscope 208 are formed on more than one chip, due to their shared packaging, the stress effects experienced by accelerometers 202-206 may be similar to the stress effects experienced by gyroscope 208. Accordingly, the descriptions of the various embodiments of the present disclosure may also apply to multiple sensors (e.g., combinations of accelerometers and gyroscopes) located on shared packaging substrates within separate dies. For example, assuming stress 210 has a bending effect on accelerometer 202, a related effect is experienced by accelerometers 204-206 and gyroscope 208. The common stress source experienced by the gyroscope and accelerometer sensors of MEMS chip 200 may be correlated between these components since they are on a common chip. Accordingly, stress level testing, testing results, and compensation based on the test results may be on a MEMS part basis.

Gyroscope 208 generates an angular velocity signal corresponding to each of the three axes, x, y, and z, in response to a MEMS chip 200 rotation about such axes, and accelerometers 202-206 each generate a linear acceleration signal corresponding to a respective one of the three axes, x, y, and z, in response to a MEMS chip 200 linear acceleration in such direction. Additionally, each of the gyroscope sense axes 208 also senses a quadrature signal. Because accelerometers 202-206 have stress responses to an external source of stress that can be correlated to a stress response of one or more axes of gyroscope 208, the stress response on the gyroscope-produced quadrature signal may be related to the effect of stresses 210, 212 on one or more of accelerometers 202-206. Accordingly, processing circuitry of MEMS chip 200 (or in some embodiments, external processing circuitry) may determine the error induced on each of accelerometers 202-206 due to applied level of stresses 210/212 based on one or more quadrature signals from gyroscope 208. During regular operation, MEMS chip 200 may modify a measured linear acceleration signal from each of the outputs of accelerometers 202-206 based on a corresponding gyroscope-generated quadrature signal. In some embodiments, MEMS chip 200 transmits an error signal in response to the level of stress from stresses 210, 212 exceeding a predetermined threshold level of stress and may not perform error compensation due to the intolerable detected stress level. For example, a MEMS part may be intolerable of a bending impact severe enough to expect to affect the performance of critical MEMS components, such as sense electrodes, and may therefore render error compensation ineffective. In some cases, despite a threshold-exceeding detected stress level, a MEMS chip may attempt to compensate for the stress-causing error regardless. For example, based on the application of a MEMS chip, the MEMS chip may be in a better position to tolerate gross or larger shape-bending impact than perhaps other applications of the MEMS chip. In some embodiments, error compensation is not performed, and the stress information is used to generate an alarm signal. For example, the stress information may be employed in generating an alarm signal in response to a detected sensing gyroscope component malfunction to avoid the risk of corruption of the accelerometer signal. This is in some cases referred to "failure isolation", a practice commonly employed in safety-critical applications, such as automotive applications.

In some embodiments, during manufacturing, MEMS chip 200 undergoes certain controlled stress level testing customized to the MEMS chip in the MEMS chip typical stress environment and on a MEMS chip part basis. During each test condition, for each MEMS chip and each accelerometer axis, axis-based quadrature signals from each axis of gyroscope 208 and the linear acceleration error (or "linear acceleration output error", as used synonymously herein) from each of the accelerometers 202-206 is measured and based on the measured quadrature signals and the measured linear acceleration signal error, a mathematical relation is derived (e.g., using multilinear regression, non-linear regression or closed-from expression determinations). The measured quadrature signals serves as input and the measured linear acceleration signal error serves as output. During operation, the in-field measured linear acceleration signal is modified with the estimated linear acceleration signal error to compensate for stress level effects unique to the particular MEMS chip. This has the effect of removing the estimated linear acceleration error from the in-field measured linear acceleration value to negate the effect of stress on the MEMS chip and improve the acceleration measurement accuracy of, for example, accelerometers 202-206.

In some cases, to increase testing efficiency, not all compensation values are derived for each MEMS part and not all compensation values are treated equally across all MEMS parts. For example, in the case where a compensation value variation is observed to be minimal for a certain number of MEMS parts of a MEMS parts batch, corresponding compensation values for the remaining MEMS parts across the batch may be set to the observed small-varying compensation values therefore bypassing determining the compensation values per part. Whereas, rapidly varying compensation values may be derived for each MEMS part of the same batch.

In some embodiments, the stress level testing may be performed in-field to estimate the linear acceleration error when the MEMS chip is known to be at rest (e.g., based on a limited change in acceleration and/or angular velocity values over time). In the presence of movement, the accelerometer error cannot be readily distinguished from an actual accelerometer output because the movement of the MEMS chip likely adversely affects the multilinear regression calculations on which the estimated acceleration error relies. In some embodiments, non-linear regression techniques may be employed for estimating the linear acceleration error of the MEMS chip.

In some embodiments, in addition to stress levels, a controlled range of temperatures may be applied to MEMS chip 200 as a secondary source of thermo-mechanical stress for a more robust stress level testing and improved estimated acceleration error results. For example, estimated linear acceleration error may be derived from mechanically induced stress level conditions in addition to temperature-induced stress level conditions, both applied to the MEMS chip during manufacturing or in-field. Stress level and temperature condition testing may be performed, in large part, as described above relative to mechanical-based stress impacts with some deviations as described below.

A temperature sensor (not shown), located internally or adjacent to MEMS chip 200, may monitor the temperature of MEMS chip 200. MEMS chip 200 may report an error in response to detecting a stress associated with a sensed temperature exceeding a threshold temperature level.

MEMS chip 200 may generate an error in response to detecting an in-field stress level exceeding a threshold stress level, in both cases to prevent possible further damage to the product, for example.

Figure 3:
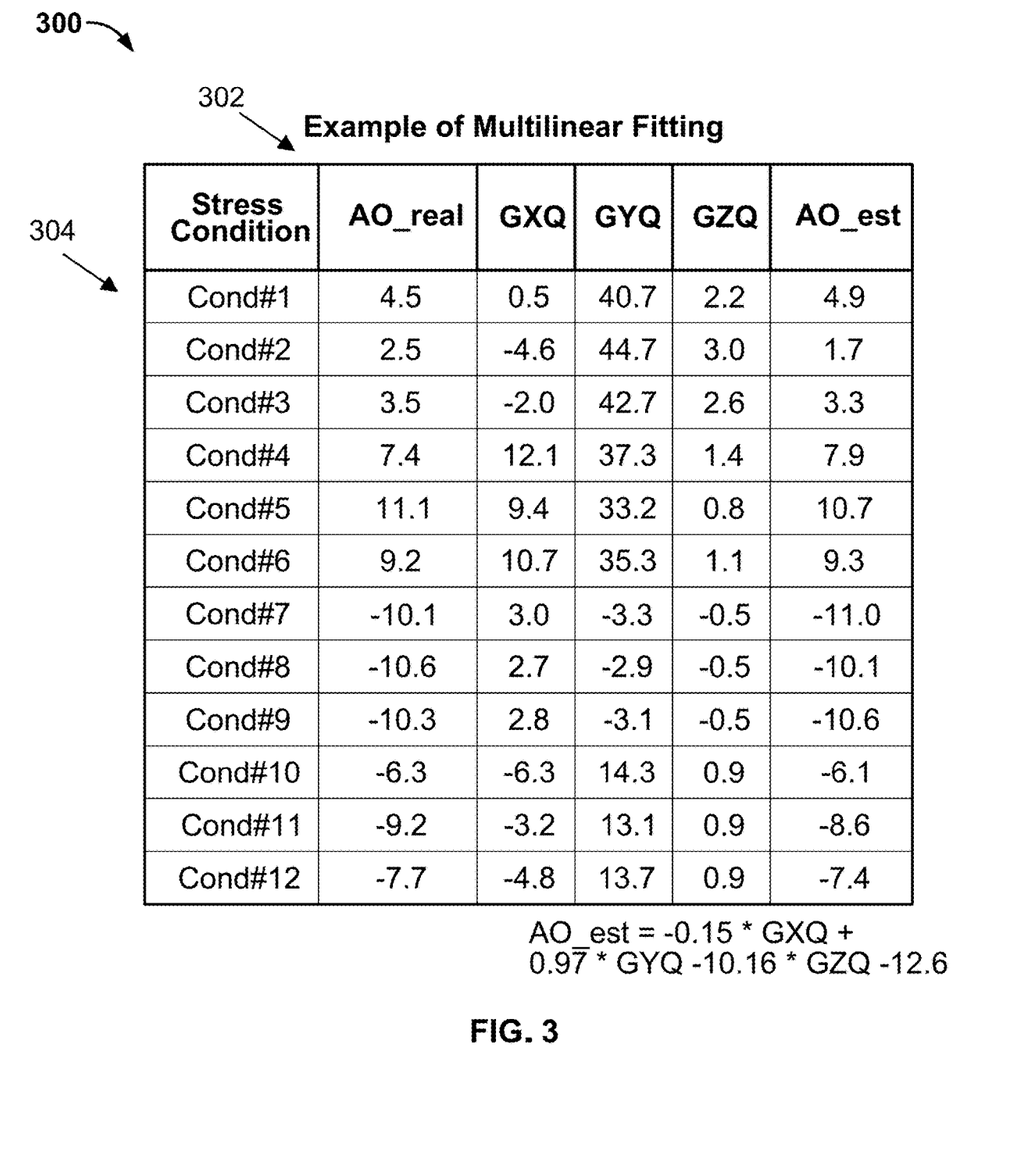
FIG. 3 depicts an exemplary multilinear regression process for a multilinear regression determination process in accordance with at least some embodiments of the present disclosure.

As earlier discussed, compensation values may be derived from the observed quadrature and accelerometer variations used for estimating linear accelerometer errors when a MEMS chip is at rest, for example, during controlled MEMS chip stress level test conditions. In some embodiments, in addition to measuring linear acceleration at the output of each axis accelerometer sensor, on a MEMS part basis, a set of observed quadrature signal data is collected for each stress test condition. The collected set of data serves as input and the measured linear acceleration error value serves as output to a multilinear regression dataset to derive the compensation values (also referred to herein collectively as "coefficients" and singularly as "coefficient"), on a part and on an accelerometer axis basis. The derived compensation coefficients are subsequently used to generate a linear acceleration equation (e.g., Eq. (1)) which is then used to estimate the measured acceleration error during in-field operation. FIG. 3 shows an exemplary multilinear regression process in accordance with at least some embodiments of the present disclosure.

In FIG. 3, a multilinear regression table 300 is shown to include multilinear regression data arranged by a set of columns 302 and a set of rows 304. As further detailed below, in embodiments applying controlled external stress conditions to a MEMS system, as disclosed herein, in a production setting, certain coefficient values are empirically determined based on the data in table 300, to effectively characterize the production test steps. The coefficient values are subsequently employed to modify the in-field linear accelerometer signal to compensate for acceleration error caused by thermo-mechanical stress.

In embodiments implementing controlled external stress conditions as disclosed herein, coefficients, such as, kx, ky, kz, and b, are determined by characterizing the production test steps. The coefficients of an acceleration equation (e.g., Eq. (1), (2), or (3) below) are essentially compensation values forming the basis for modifying the linear acceleration signal during in-field operation to compensate for acceleration measurement errors introduced from stress impact. The compensation values associate a corresponding value of the quadrature signal (e.g., GXQ, GYQ, or GZQ) with an external stress applied to the system during a stress condition testing. To determine the compensation values, controlled external stresses (e.g., Cond #1-Cond #12) are applied to the MEMS system (e.g., MEMS chip 200 of FIG. 2), as discussed further with reference to FIGS. 2 and 3 below.

Table 300 is an example multilinear regression table for a MEMS chip with a one-axis accelerometer and a 3-axis gyroscope. It is understood that the multilinear regression table 300 may be modified to apply to a different variation and a different number of components in a MEMS chip, as previously discussed. It is also understood that the multilinear regression table data of FIG. 3 is merely an example dataset for example stress test conditions and that other data from other types or numbers of stress test conditions may be employed. The values shown in table 300 are normalized representations of corresponding measured values.

In table 300, columns 302 include a first column representing linear acceleration error values ("AO_real") measured at an accelerometer output of a MEMS chip undergoing controlled stress test conditions. Applying the data of table 300 to MEMS chip 200 of FIG. 2, AO_real may be a measured output acceleration error, for example, of any of accelerometers 202-206. Columns 302 further include a second column representing an x-axis gyroscope quadrature output ("GXQ"), followed by a third column representing a y-axis gyroscope quadrature output ("GYQ"), followed by a fourth column representing a z-axis gyroscope quadrature output ("GZQ"). With continued reference to the embodiment of FIG. 2, GXQ may be the x-axis quadrature output of gyroscope 208, GYQ may be the y-axis quadrature output of gyroscope 208, and GZQ may be the z-axis quadrature output of gyroscope 208, for example. In embodiments with less than three-axis gyroscope measurement capability (due to a fewer number of on-board gyroscope sensors) and/or in which it is desired to perform compensation based on fewer quadrature axes, columns corresponding to non-measured gyroscope quadrature outputs may be missing from table 300. For example, in a MEMS system that does not use a z-axis gyroscope quadrature output for accelerometer stress compensation, column GZQ may be missing from table 300. The last column of the set of columns 302 of table 300 represents an estimated linear acceleration error ("AO_est"), which corresponds to errors determined according to the output of the equation generated by multilinear regression. Accordingly, the AO_est values for each test condition represents a corresponding estimated linear acceleration error based on particular quadrature values. As can be seen from FIG. 3, the values determined according to the output equation generally correspond to the actual measured acceleration response to the particular stress conditions.

Rows 304 of table 300 represent the controlled stress test conditions—the external stress applied to the system (e.g., MEMS chip 300) during manufacturing or in-field testing. In the example of FIG. 3, the stress condition is presumed to have a bending shape response on the gyroscope of the MEMS chip under test. It is, however, understood that the stress level conditions of rows 304 may be due to a different response or a different response in combination with the bending share response. Rows 304 include 12 distinct rows, each row representing a distinct bending condition stress test. For example, the first row starting from the top of table 300 represents the first bending test condition ("Cond #1"), the second row represents the second bending test condition ("Cond #2"), the third row represents the third bending test condition ("Cond #3), and so on. With continued reference to MEMS chip 200 of FIG. 2, in the case where Cond #1 bending test condition is applied to MEMS chip 200, AO_real is measured 4.5, GXQ is measured 0.5, GYQ is measured 40.7, and GZQ is measured 2.2. In the case where Cond #10 bending test condition is applied to MEMS chip 200, AO_real is measured−6.3, GXQ is measured−6.3, GYQ is measured 14.3, and GZQ is measured 0.9, and so on.

In embodiments applying the bending test conditions of table 300 during production, under controlled conditions where the MEMS chip is reliably maintained at a rest position, under ideal conditions, AO_real is expected to be 0 for all 12 bending test conditions because "AO_real" represents a linear acceleration error. But practically, with each bending condition, a corresponding stress-based acceleration error is observed in table 300. For example, under Cond #1, AO_real is 4.5, under Cond #2, AO_real, and so on.

With continued reference to MEMS chip 200 of FIG. 2, after completion of the collection of the data shown in table 300 (except for AO_est), the coefficients of the following mathematical equation may be obtained using multilinear regression:

$$AO = kx*GXQ + ky*GYQ + kz*GZQ + b \quad \text{Eq. (1)}$$

In Eq. (1), "AO" represents linear acceleration error; "GXQ" represents an x-axis gyroscope quadrature output; "GYQ" represents a y-axis gyroscope quadrature output; "GZQ" represents a z-axis gyroscope quadrature output; "kx" represents the x-axis gyroscope coefficient; "ky" represents the y-axis gyroscope coefficient; "kz" represents the z-axis gyroscope coefficient; and "b" represents a constant term that may be added to the compensation formula of Eq. (1). In some embodiments, "b" may be omitted from the compensation formula.

The coefficients kx, ky, kz, and b in Eq. (1) are obtained by performing a multilinear regression step using the data of table 300 for each stress test condition. Specifically, AO, GXQ, GYQ, and GZQ values of a row of rows 304 serve as the input to the multilinear regression algorithm. Nonlimiting examples of multilinear regression algorithms that may be implemented for deriving the coefficients kx, ky, kz, and b of Eq. (1) include ordinary and generalized least-squares, maximum likelihood estimation and least absolute deviation.

Once the coefficients are derived, for each stress test condition (each row of table 300), as depicted in FIG. 3, the values for AO_est (last column of columns 302 of table 300) are calculated according to Eq. (1) above using the measured gyroscope quadrature values of table 300 (GXQ, GYQ, and GZQ) and the multilinear regression-derived coefficients, kx, ky, kz, and b. The accuracy of resulting compensation is represented by how closely the value of AO_est matches the one of AO_real, for each row. It is appreciated that the greater the number of stress test conditions applied to a MEMS system, such as MEMS chip 200 of FIG. 2, the more accurately the multilinear regression coefficients are derived, consequently, the greater the estimated acceleration error, AO_est, accuracy.

In systems employing 2-axis or a 3-axis (e.g., MEMS chip 200) of acceleration sensing, measurement, the calculation depicted for table 300 may be performed for each of the additional acceleration axes to calculate coefficients corresponding to the respective acceleration error of each acceleration axis due to particular stress conditions and quadrature outputs. For example, in reference to the embodiment of FIG. 2, table 300 would be extended to include 2 additional columns for measured linear acceleration values, from which coefficients for each of the additional accelerometer axes could be determined.

As earlier discussed, in some embodiments, a secondary source of stress, varying temperature conditions, may be incorporated into a MEMS system-controlled stress testing conditions. In this respect, the acceleration measurements of the MEMS system, when in-field, may be compensated for over a temperature range to account for temperature-induced stress in addition to externally induced bending stress, for example. In a test environment with an additional applied temperature variation, the accelerometer output variation ("AO") of each stress test condition at a particular temperature, may be expressed in accordance with the following relationship:

$$AO = kx*GXQ + ky*GYQ + kz*GZQ + kT*T + b \quad \text{Eq. (2)}$$

The variables and coefficients of Eq. (2) are in common with counterpart variables and coefficients of Eq. (1), respectively, and explained above in relation to Eq. (1). Eq. (2) additionally includes a temperature coefficient (temperature compensation value), represented by "kT", and temperature, represented by "T". As with Eq. (1), the coefficients kx, ky, kz and b, for each MEMS part, are obtained by performing multilinear regression determinations (e.g., as discussed above relative to table 300) but in the case of Eq. (2), these coefficients are obtained by performing multilinear regression with the multilinear regression input data (e.g., T, GXQ, GYQ, and GZQ) and the multilinear regression output data (e.g., AO_real) collected at various temperatures, "T" in Eq. (2). Given the increased number of coefficients in Eq, (2), kT, for example, a larger number of stress test dataset may be required relative to the requisite number of stress test dataset for Eq. (1). In some embodiments, determining compensation values kx, ky, kz, and kT and b requires at least five measurement points for each MEMS system part. An example graphical representation of comparative performance graphs of linear acceleration error compensation with a full dataset measurement, and a competing compensation scheme is presented and discussed relative to FIG. 5. While a greater linear acceleration error accuracy or a more stress-fitting error approximation technique may be realized with the approach of Eq. (2), a greater number of requisite variables (5 in Eq. (2) versus 4 in Eq. (1)), increases the relative level of complexity associated with, for example, performing multilinear regression operations. In some embodiments, non-linear regression techniques, for example and without limitation, Gauss-Newton and Levenberg Marquardt methods, may be employed.

Figure 5:
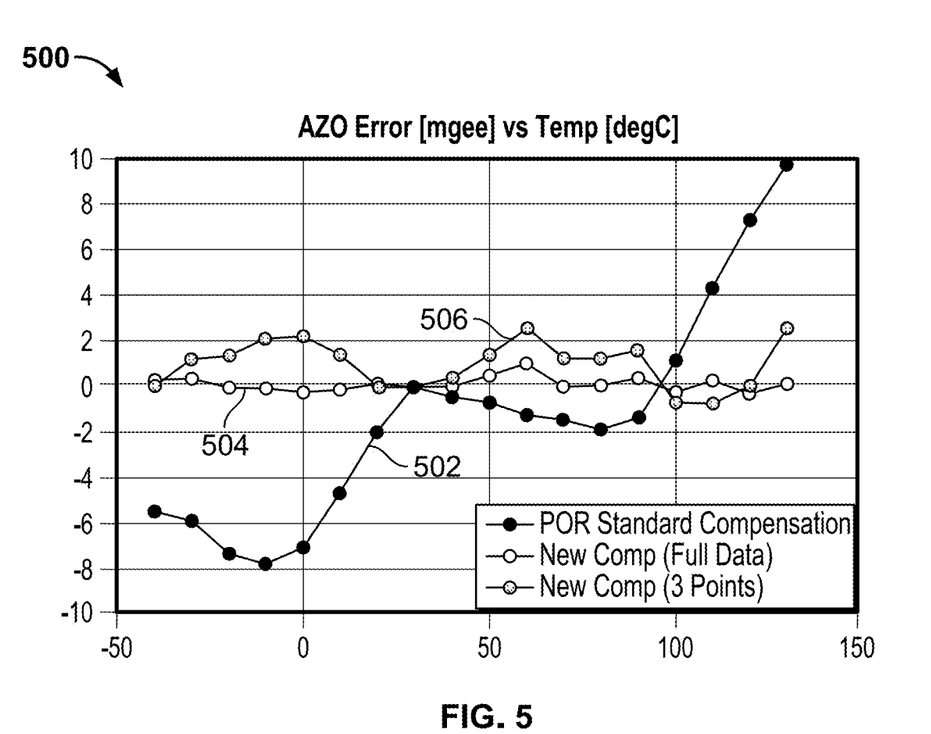
FIG. 5 depicts a graphical representation of an exemplary comparison of compensated MEMS linear acceleration errors under different stress conditions, in accordance with at least some embodiments of the present disclosure.

In some embodiments, to reduce the requisite number of measurement points while maintaining temperature as an additional stress source, the acceleration output may be derived from a reduced expression as follows:

$$AO = kz*GZQ + kT*T + b \quad \text{Eq. (3)}$$

where "GZQ" represents a z-axis gyroscope quadrature output, and "T" represents temperature. In some embodiments, the number of temperature measurements of a known temperature range for characterizing the compensation values kz, kT, and b may be as few as three distinct temperature values while maintaining effective linear acceleration error accuracy. An example graphical representation of comparative performance graphs of the linear acceleration error with a full dataset measurement, a reduced dataset measurement, and a competing compensation scheme is presented and discussed relative to FIG. 5.

With reference to a single axis (e.g., x-axis) gyroscope measurement, using the measured quadrature output and the linear acceleration output errors, corresponding compensation values may be derived with a multilinear regression process for one axis using the following equation for a one-axis estimated linear acceleration output error:

$$AO = kx*GXQ \quad \text{Eq. (4)}$$

With any of the above approaches, during field operation, the in-field measured linear acceleration signal is modified by removing a corresponding estimated accelerometer error component from the measured linear acceleration signal. In some embodiments, once the coefficients for the compensation formula (Equations (1) to (4) above) are determined, measured combination of gyroscope quadrature output, GXQ, GYQ and GZQ values, can be substituted into the compensation formula to obtain the estimated accelerometer error.

Figure 4:
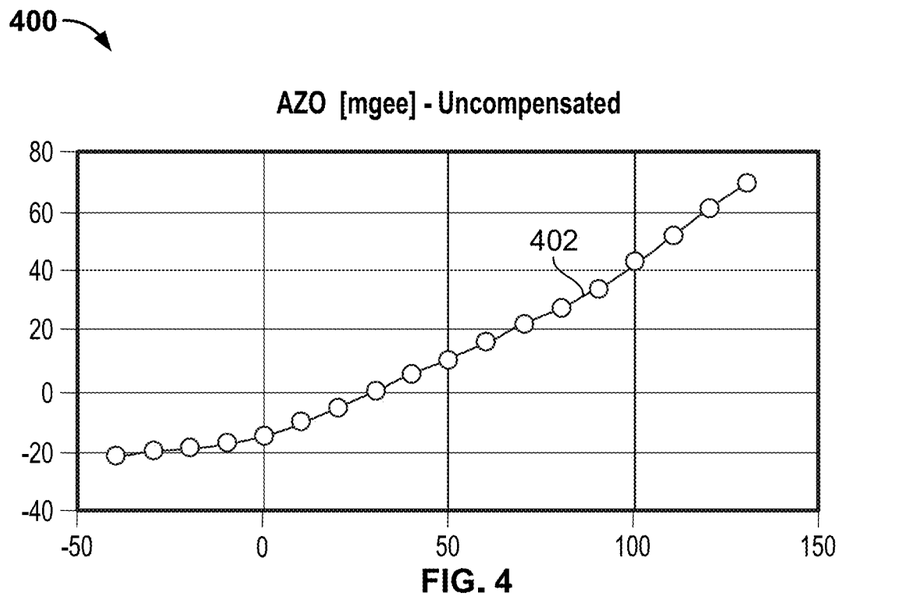
FIG. 4 depicts a graphical representation of an uncompensated MEMS linear acceleration error under different stress conditions, in accordance with at least embodiments of the present disclosure.

FIG. 4 depicts a graphical representation of an uncompensated MEMS linear acceleration error under different stress conditions, in accordance with at least embodiments of the present disclosure. In FIG. 4, a graphical representation of an example in-field measured linear accelerometer signal with no applied compensation shown. In FIG. 4, a graphical representation 400 is shown to include a graph 402 representing an exemplary linear acceleration output of a MEMS chip with stress-induced impact but without modification to the linear acceleration output signal to compensate for stress-causing acceleration errors, such as compensation techniques of various embodiments disclosed herein. In FIG. 4, the x-axis represents temperature in Celsius and the y-axis represents a z-axis linear acceleration output error in milligees (mgees). For example, the y-axis may represent an accelerometer output error against the x-axis varying temperatures. For simplicity of illustration, graph 452 is shown to represent a single-axis accelerometer output, namely accelerometer output values from a z-axis accelerometer. The z-axis linear accelerometer output error values are shown to span across a range of linear acceleration output values of approximately −20 mgees to +70 mgees, and across a temperature range of approximately −50 C-+130 C. As shown at graph 402, the linear acceleration values are nearly without any bound to compensate for stress level errors.

FIG. 5 depicts a graphical representation of an exemplary comparison of compensated MEMS linear acceleration errors under different stress conditions with a constant acceleration input, in accordance with at least some embodiments of the present disclosure. In FIG. 5, a graphical representation of a comparative example of various linear accelerometer error graphs for different systems are shown. In FIG. 5 a graphical representation 500 is shown to include a graph 502 representing linear acceleration errors of a prior art method of compensation, a graph 504 representing linear acceleration errors of a stress level testing technique using a full set of data, in accordance with various embodiments disclosed herein, and a graph 506 representing linear acceleration errors of a stress level testing technique using a reduced set of data, in accordance with various embodiments disclosed herein. In FIG. 5, the x-axis represents temperature in Celsius and the y-axis represents a z-axis linear acceleration output error in milligees. For example, the y-axis may represent an accelerometer output error against the x-axis varying temperatures. For simplicity of illustration, graphs 502-506 are shown to represent a single-axis accelerometer output, namely accelerometer output error values from a z-axis accelerometer. The z-axis linear accelerometer output error values are shown to span across a range of linear acceleration output error values of approximately −8 mgees-+10 mgees and across a temperature range of approximately −45 C to +130 C.

In some embodiments, the values of graph 504 are derived from a technique using the approach of Eq. (1) to determine AO est with a full dataset as opposed to the technique using the approach of Eq. (3) with a reduced dataset (3 distinct temperature points) for determining AO_est As shown in FIG. 5, the difference between the graphs 504 and 506 is rather minimal but they both perform better than a system represented by graph 502. For example, at temperature 0, while graph 502 indicates an error of approximately −7 mgees, at the same temperature, graph 504 indicates a near zero error and graph 506 indicates an error or +2 mgees.

Figure 6:
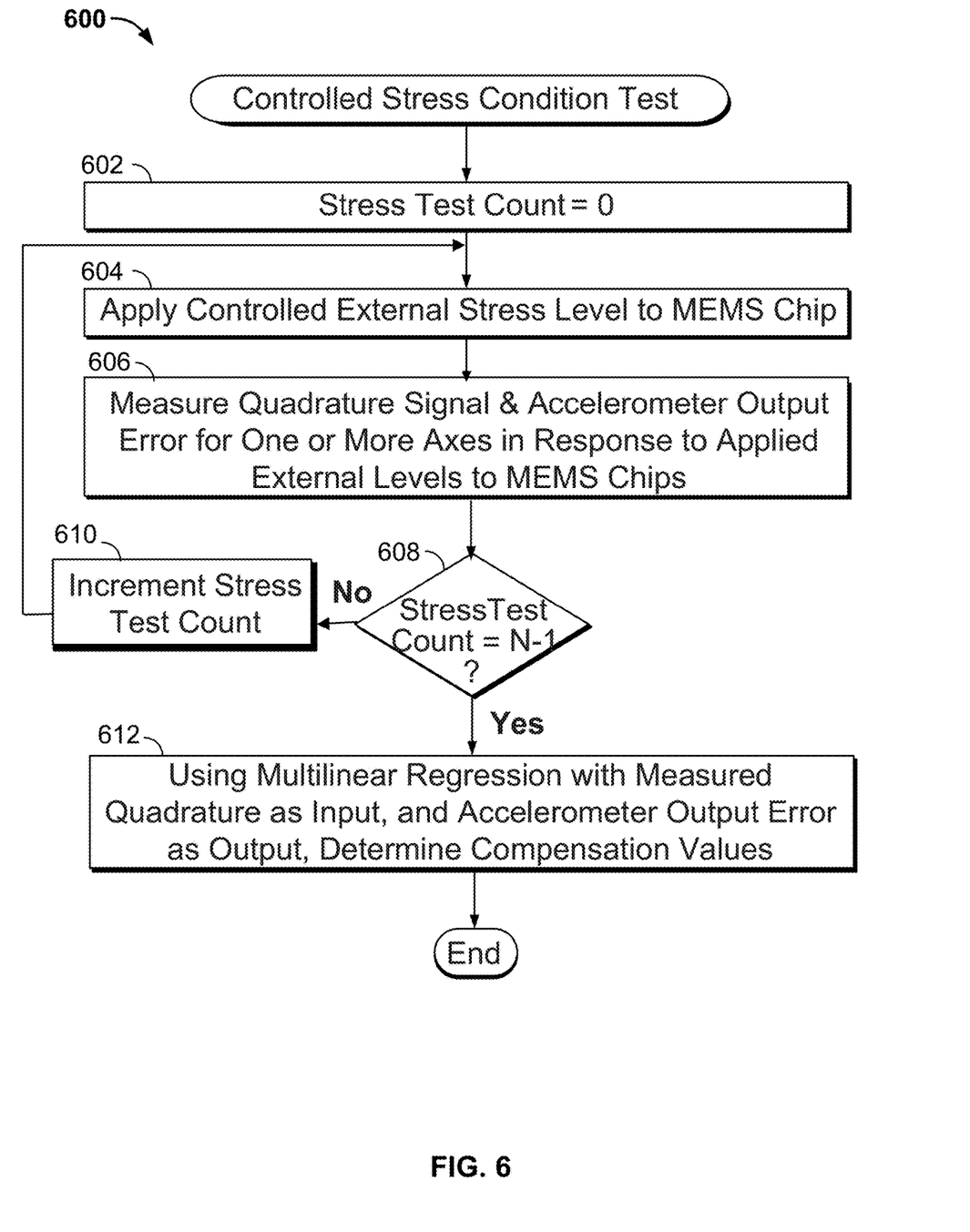
FIG. 6 illustrates steps of an exemplary controlled stress condition test process for a MEMS accelerometer in accordance with at least some embodiments of the present disclosure.

FIG. 6 illustrates steps of an exemplary controlled stress condition test process for a MEMS accelerometer in accordance with at least some embodiments of the present disclosure. Although FIG. 6 is described in the context of the particular structures and components of the present disclosure, it will be understood that the methods and steps described in FIG. 6 may be applied to a variety of MEMS accelerometer designs, controlled stress test techniques, processing circuitry, and compensation techniques. Although a particular order and flow of steps is depicted in FIG. 6, it will be understood that in some embodiments one or more of the steps may be modified, moved, removed, or added, and that the flow depicted in FIG. 6 may be modified. The controlled stress condition test operation of FIG. 6 is described with reference to the processing circuitry of FIG. 1 and the MEMS chip of FIG. 2 for the benefit of simplicity. It is understood that alternate processing circuitry suitable for carrying out the steps of FIG. 6 may be employed.

At step 602 of controlled stress condition test operation 600, a stress test count starts at the value '0'. It is understood that the stress test count may start at a value other than '0', suitable for maintaining a count of the number of desired external conditions to which a MEMS system under test is to undergo for effective compensation of linear acceleration variation errors. For the benefit of simplicity and by way of example, processing circuitry 100 of FIG. 1 may start the stress test count for maintaining a count of the number of external stress conditions applied to MEMS chip 200 at the value '0'.

Steps 604 through 610 of operation 600 are repeated "N" number of times ("N" being an integer value) for N number of controlled test conditions applied to the MEMS chip (e.g., MEMS chip 200 of FIG. 2.) to test for one or more accelerometer axis responses based on one or more gyroscope axes. Any combination of acceleration and gyroscope may be tested (e.g., one axis accelerometer and two-axis gyroscope, three-axis accelerometer and three-axis gyroscope). Each accelerometer axis is associated with one or more gyroscope axes in the calculations and steps of operation 600. Each applied stress can be a physical stress (e.g., bending), a temperature-based stress, or a combination thereof.

At step 604, a controlled stress condition is applied to the MEMS chip under test for an accelerometer axis (e.g., x-axis, y-axis, or z-axis). For example, with reference to table 300, processing circuitry 100 may apply the controlled external stress level corresponding to Cond #1 to MEMS chip 200, at step 604.

The result of the applied condition at step 604 is measured at step 606 of operation 600. The measurement for each axis of acceleration being measured at step 606 is associated with the applied stress and/or temperature and the measured gyroscope outputs. More specifically, at step 606, processing circuitry 100 measures the quadrature signal at the output of one or more gyroscope 208 axes and the accelerometer output error at the output of one of the accelerometers 202-206. For example, in response to application of the test condition Cond #1 to MEMS chip 200, processing circuitry 100 may measure the quadrature output of an x-axis gyroscope sensor of MEMS chip 200 for a one-axis gyroscope and the accelerometer output error of an x-axis, y-axis, or z-axis accelerometer sensor of MEMS chip 200 for a one-axis accelerometer. It is understood that in the case of additional gyroscope and/or accelerometer axes, processing circuitry 100 measures additional corresponding quadrature outputs and/or corresponding accelerometer axes, accordingly. For example, gyroscope 208 (FIG. 2) may measure quadrature signals and accelerometer accelerometers 202-206 may measure respective accelerometer output errors for all three axes in response to each controlled stress test, in which case, at step 606, processing circuitry 100 measures the quadrature output of the x, y, and z-gyroscopes, such as described above with reference to Eq. (1). In some embodiments, the test equipment for applying test condition Cond #1 or other test conditions is located externally to the MEMS chip. In some embodiments, the test equipment for applying test condition Cond #1 or other test conditions is located internally to the MEMS chip (e.g. self-heating components).

As stated above, processing circuitry 100 may also measure the linear acceleration error at the output of x-axis accelerometer 202, y-axis accelerometer 204, and/or z-axis accelerometer 206. Similarly, in the case where acceleration in the direction of additional axes is relevant to compensation, for example, the accelerometer outputs error of accelerometers 204 (y-axis) and 206 (z-axis), processing circuitry 100 measures linear acceleration error at the output of each respective accelerometer. In some embodiments, additionally, temperature may be measured as described herein.

For each accelerometer axis, the appropriate formulas, as discussed above, may be used based on the number of gyroscope axes for compensation and other inputs (e.g., temperature).

At step 608, processing circuitry 100 tests the stress test count against a value, N−1, and if the total number of tests has been completed (e.g., total number of tests is equal to N−1), operation 600 proceeds to step 612, otherwise, operation 600 proceeds to step 610. At step 610, processing circuitry 100 increments the stress test count by one to account for the completion of the first controlled stress test condition application and operation 600 returns to and resumes from step 604 to test the MEMS part under the next controlled stress test condition. In some embodiments, at step 602 of operation 600, the test count is the maximum number of desired stress level tests, at step 608, the stress test count is tested against the value 0, and at step 610, the stress test count is decremented. As earlier noted, steps 604-610 are repeated N times, each of the N times, for a distinct stress test condition and the measured results are saved in a table similar to table 300.

At step 612, processing circuitry 100 determines the compensation values (or coefficient kx in Eq. (4)) using all of the N number of the measured quadrature values as input and the measured acceleration output error as output for all measured axes from the N repeated steps of 604, 606, and 608, to determine corresponding coefficients. For example, with reference to Eq. (4), the measured quadrature signal, GXQ (for the x-axis), and the measured accelerometer signal, AO_real (for the x-axis), are input to a multilinear regression dataset to determine the kx coefficient in Eq. (4) above.

Figure 7:
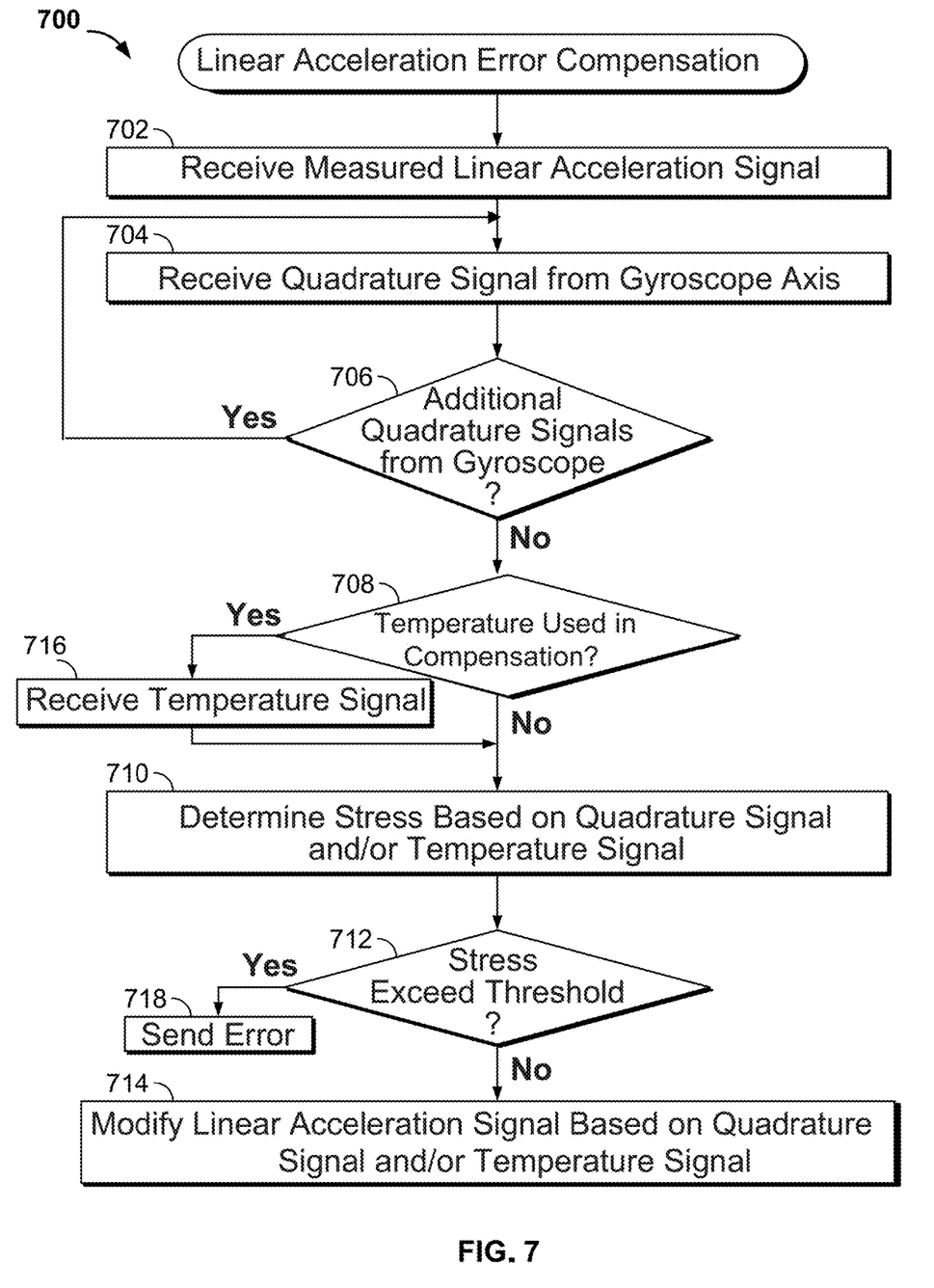
FIG. 7 illustrates steps of an exemplary linear acceleration error compensation process for a MEMS accelerometer in accordance with at least some embodiments of the present disclosure.

FIG. 7 illustrates steps of an exemplary linear acceleration error compensation process for a MEMS accelerometer in accordance with at least some embodiments of the present disclosure. Although FIG. 7 is described in the context of the particular structures and components of the present disclosure, it will be understood that the methods and steps described in FIG. 7 may be applied to a variety of MEMS accelerometer designs, linear acceleration error compensation techniques and processing circuitry. Although a particular order and flow of steps is depicted in FIG. 7, it will be understood that in some embodiments one or more of the steps may be modified, moved, removed, or added, and that the flow depicted in FIG. 7 may be modified.

The error compensation operation of FIG. 7 is described with reference to the processing circuitry of FIG. 1 and the MEMS chip of FIG. 2 for the benefit of simplicity. It is understood that alternate processing circuitry suitable for carrying out the steps of FIG. 7 may be employed. At step 702 of the linear acceleration error compensation operation 700, a measured linear acceleration signal is received. For example, processing circuitry 100 may receive the output of accelerometer 206.

At step 704, a first quadrature axis signal that will be used to compensate linear acceleration based on compensation values determined is received. Processing circuitry 100 may receive the quadrature signal corresponding to a first gyroscope axis. For example, in the case of compensating for errors with an x-axis gyroscope sensor, processing circuit 100 may receive the quadrature signal from the output of the x-axis gyroscope.

At step 706, the system determines whether additional quadrature signals from possible other onboard gyroscopes, for example, a y-axis gyroscope and/or a z-axis gyroscope measurement, are to be used for compensation, similar to the above x-axis gyroscope example. If no further gyroscope outputs are to be used for compensation, operation 700 proceeds to step 708, otherwise, operation 700 proceeds to step 704 and the process repeats from step 704 through step 706 until all relevant gyroscope signals for compensation are received. For example, processing circuitry 100 may receive up to two more quadrature signals from a remaining two onboard gyroscopes.

At step 708, if temperature is to be used for compensation, process 700 proceeds to step 716. At step 716, a temperature signal with a temperature value from an onboard temperature sensor is received. If at step 708, it is determined that temperature is not to be used for compensation, operation 700 proceeds to step 710.

At step 710, processing circuitry 100 determines the stress on the MEMS chip under test based on the measured quadrature signal(s) and possible temperature signal by finding the estimated linear accelerometer error value of a stress test condition based on the appropriate coefficients for the linear acceleration axis and corresponding measured quadrature and other (e.g., temperature) values from the processing of operation 700 of FIG. 7.

At step 712, the stress determined at step 710 is tested against a threshold stress. In response to determining the stress at step 710 exceeds a threshold stress, operation 700 proceeds to step 718 and an error signal is transmitted. For example, an error signal may be generated at step 718 in response to a determination, at step 712, that the stress level is at an intolerably high level. For example, processing circuitry 100 may compare the stress level determined at step 710 to a predetermined threshold stress level and if processing circuitry 100 finds the threshold stress level exceeded, processing circuitry 100 may transmit an error signal to the remaining components of the MEMS system, such as without limitation, other components of a circuit board housing the MEMS chip under test. In response to a determination that the stress threshold has not been exceeded at step 712, operation 700 proceeds to step 714. At step 714, the linear acceleration signal measured by accelerometer sense electrodes, of step 702, is modified based on the quadrature and temperature (if any) signals from steps 704 and 716, respectively. For example, processing circuitry 100 may remove the estimated linear acceleration error, determined at step 710, from the measured linear acceleration signal at step 702. In some embodiments, the estimated linear acceleration error that is ultimately removed is calculated by using one of Eq. (1)-(4), above. In some embodiments, as previously discussed, the linear acceleration signal need not be modified and the error signal is generated if required.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A microelectromechanical system (MEMS) system, comprising:
a gyroscope including a first proof mass, wherein the gyroscope is configured to output a quadrature signal and an angular velocity signal based on a movement of the first proof mass in response to an angular velocity;
an accelerometer including a second proof mass, wherein the accelerometer is configured to output a linear acceleration signal based on a movement of the second proof mass in response to a linear acceleration; and
processing circuitry coupled to the gyroscope and the accelerometer to receive the quadrature signal and the linear acceleration signal, wherein the processing circuitry is configured to modify the linear acceleration signal based on the quadrature signal.

2. The MEMS system of claim 1, wherein the modification of the linear acceleration signal is based on one or more compensation values.

3. The MEMS system of claim 2, wherein each of the compensation values associates a corresponding value of the quadrature signal with an external stress applied to the system.

4. The MEMS system of claim 3, wherein to determine the compensation values, a plurality of controlled external stresses are applied to the MEMS system.

5. The MEMS system of claim 4, wherein the plurality of controlled external stresses are applied over a controlled range of stresses for the MEMS system.

6. The MEMS system of claim 2, wherein to determine the one or more compensation values, a plurality of known temperatures is applied to the MEMS system.

7. The MEMS system of claim 6, wherein the plurality of known temperatures is applied over a known range of temperatures for the MEMS system.

8. The MEMS system of claim 7, wherein the known range of temperatures includes at least two distinct temperatures within the known range of temperatures for the MEMS system.

9. The MEMS system of claim 1, further comprising a temperature sensor configured to generate a temperature signal, wherein the modification of the linear acceleration signal is further based on the temperature signal.

10. The MEMS system of claim 1, wherein an axis of the angular velocity measured by the gyroscope is the same as an axis of the linear acceleration measured by the accelerometer, wherein the angular velocity is represented by the angular velocity signal and the linear acceleration is represented by the linear acceleration signal.

11. The MEMS system of claim 1, wherein an axis of the angular velocity measured by the gyroscope is orthogonal to an axis of the linear acceleration measured by the accelerometer, wherein the angular velocity is represented by the angular velocity signal and the linear acceleration is represented by the linear acceleration signal.

12. The MEMS system of claim 1, further comprising a second gyroscope configured to output a second quadrature signal and a second angular velocity signal, wherein the processing circuitry is further configured to modify the linear acceleration signal based on the second quadrature signal.

13. The MEMS system of claim 12, further comprising a third gyroscope configured to output a third quadrature signal and a third angular velocity signal, wherein the processing circuitry is further configured to modify the linear acceleration signal based on the third quadrature signal.

14. The MEMS system of claim 1, further comprising a second accelerometer configured to output a second linear acceleration signal, wherein the processing circuitry is configured to modify the second linear acceleration signal based on the quadrature signal.

15. The MEMS system of claim 1, further comprising a third accelerometer configured to output a third linear acceleration signal, wherein the processing circuitry is configured to modify the third linear acceleration signal based on the quadrature signal.

16. A microelectromechanical system (MEMS) system, comprising:
a gyroscope including a first proof mass, wherein the gyroscope is configured to output a quadrature signal and an angular velocity signal based on a movement of the first proof mass in response to an angular velocity;
an accelerometer including a second proof mass, wherein the accelerometer is configured to output a linear acceleration signal based on a movement of the second proof mass in response to a linear acceleration; and
processing circuitry coupled to the gyroscope and the accelerometer to receive the quadrature signal and the linear acceleration signal, wherein the processing circuitry is configured to determine a level of stress on the accelerometer based on the quadrature signal, the processing circuitry further configured to-transmit an error signal based on the level of stress.

17. The MEMS system of claim 16, further comprising a temperature sensor configured to generate a temperature signal representing a temperature value, wherein the processing circuitry is further configured to determine the level of stress on the accelerometer based on the temperature value.

18. The MEMS system of claim 16, further comprising a second gyroscope configured to output a second quadrature signal and a second angular velocity signal, wherein the processing circuitry is further configured to determine the level of stress on the accelerometer based on the second quadrature signal.

19. The MEMS system of claim 18, further comprising a third gyroscope configured to output a third quadrature signal and a third angular velocity signal, wherein the processing circuitry is further configured to determine the level of stress on the accelerometer based on the third quadrature signal.

20. A method of determining a linear acceleration on a microelectromechanical system (MEMS) system, comprising:
receiving a quadrature signal and an angular velocity signal generated by a gyroscope based on a movement of a first proof mass of the gyroscope in response to an angular velocity;
receiving a linear acceleration signal generated by an accelerometer based on a movement of a second proof mass of the accelerometer in response to a linear acceleration;
modifying the linear acceleration signal based on the quadrature signal; and
determining the linear acceleration based on the modified linear acceleration signal.

* * * * *

UNITED STATES PATENT AND TRADEMARK OFFICE
CERTIFICATE OF CORRECTION

PATENT NO. : 11,473,909 B2
APPLICATION NO. : 16/996523
DATED : October 18, 2022
INVENTOR(S) : Pietro Scafidi et al.

It is certified that error appears in the above-identified patent and that said Letters Patent is hereby corrected as shown below:

In the Claims

In Claim 1, Line 11, Column 17, please delete "in response to an angular velocity".

In Claim 4, Line 30, Column 17, please delete "are" and insert --is--.

In Claim 5, Line 32, Column 17, please delete "are" and insert --is--.

In Claim 10, Line 48, Column 17, please delete "the" and insert --an--.

In Claim 11, Line 54, Column 17, please delete "the" and insert --an--.

In Claim 16, Line 21, Column 18, please delete "in response to an angular velocity".

In Claim 20, Lines 57 and 58, Column 18, please delete "in response to an angular velocity".

Signed and Sealed this
Seventeenth Day of January, 2023

Katherine Kelly Vidal
*Director of the United States Patent and Trademark Office*